United States Patent [19]

Michel

[11] 4,036,371

[45] July 19, 1977

[54] SUPPORT STRUCTURE FOR FURNITURE, SHELVES OR THE LIKE

[75] Inventor: Karl Michel, Ulm, Germany

[73] Assignee: Gebruder Vieler GmbH, Letmathe, Germany

[21] Appl. No.: 657,832

[22] Filed: Feb. 13, 1976

[30] Foreign Application Priority Data

Feb. 18, 1975 Germany .................. 7504893[U]

[51] Int. Cl.² .......................................... A47B 96/14
[52] U.S. Cl. ......................... 211/182; 248/188.4; 403/171; 403/231
[58] Field of Search .............. 211/182, 186, 189, 187, 211/188; 403/171, 219, 231, 169, 205, 382, 295, 376, 377; 248/188.4; 108/153, 156, 111

[56] References Cited

U.S. PATENT DOCUMENTS

| | | | |
|---|---|---|---|
| 287,913 | 11/1883 | Dawson | 248/188.4 |
| 1,878,765 | 9/1932 | Erlich | 211/188 X |
| 2,581,032 | 1/1952 | Landsman | 211/182 X |
| 2,936,530 | 5/1960 | Bowen | 403/171 X |
| 3,104,123 | 9/1963 | Newkirk | 211/182 X |
| 3,268,252 | 8/1966 | Rolland | 211/182 X |
| 3,429,602 | 2/1969 | Dirilgen | 403/295 |
| 3,851,601 | 12/1974 | Davis | 211/182 X |
| 3,966,338 | 6/1976 | Ghyczy | 108/156 X |

FOREIGN PATENT DOCUMENTS

1,272,062  8/1961  France .................. 108/153

*Primary Examiner*—Roy D. Frazier
*Assistant Examiner*—Robert W. Gibson, Jr.
*Attorney, Agent, or Firm*—Michael J. Striker

[57] ABSTRACT

A support structure for furniture, shelves or the like comprises at least one vertical column and at least one crossbar releasably connected to the vertical column. The vertical column comprises at least two tubular members abutting with end faces thereof against each other, a tension member extending through the tubular members and a pair of end members connected in such a manner to opposite ends of the tension member to engage the end faces of the tubular members opposite the abutting end faces for maintaining the abutting end faces in tight engagement with each other. One of the tubular members is provided with laterally projecting coupling means releasably connected to the crossbar.

10 Claims, 4 Drawing Figures

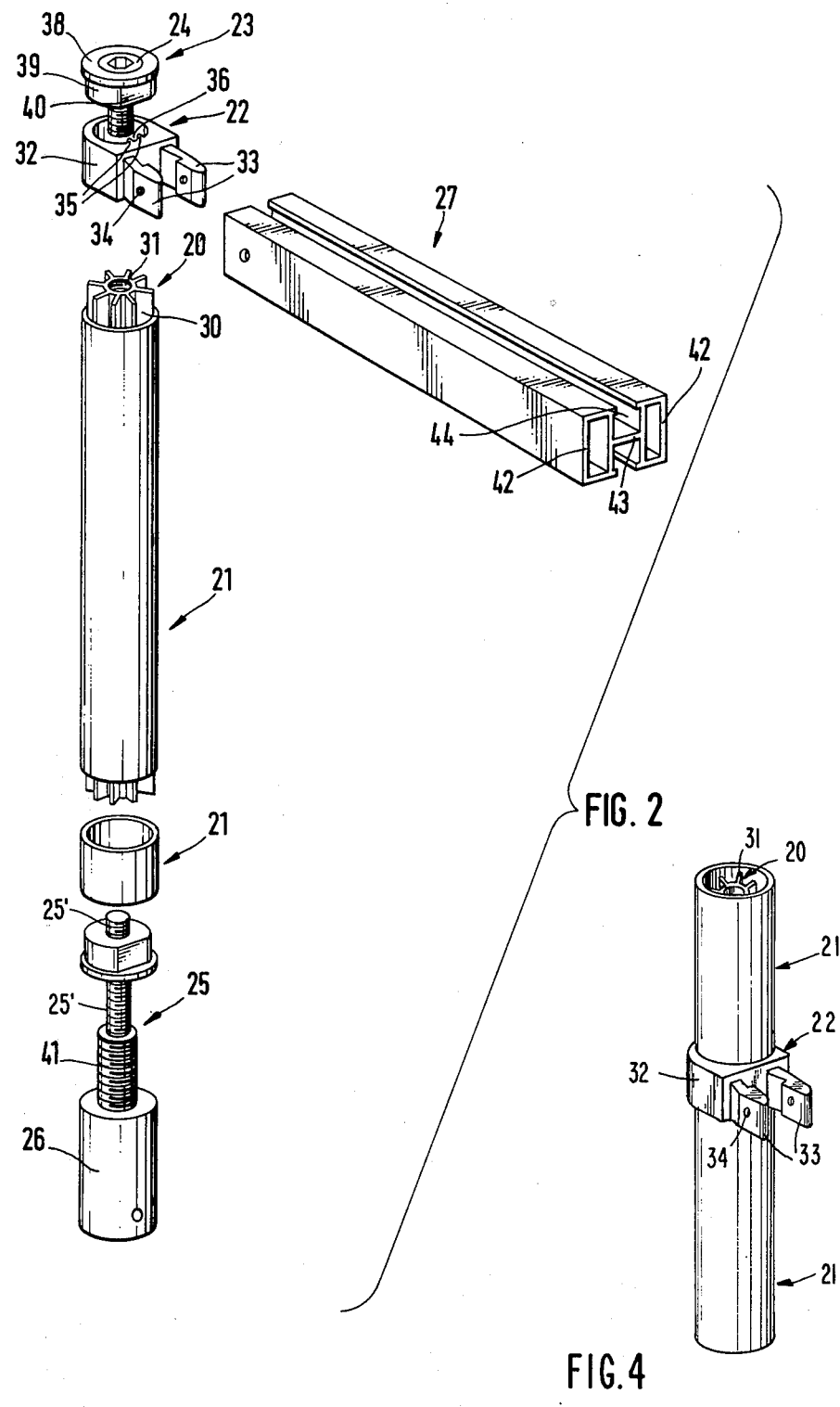

SUPPORT STRUCTURE FOR FURNITURE, SHELVES OR THE LIKE

BACKGROUND OF THE INVENTION

The present invention relates to a support structure for furniture, shelves, display stands or the like with at least one vertical column and at least one crossbar releasably connected thereto, in which the column consists of tubular column sections between facing ends of which at least one coupling member is arranged having a laterally projecting portion engaged with the crossbar. In a known support structure the aforementioned kind plugs are inserted into the facing ends of the tubular column sections in which the projecting ends of the plugs are formed as hollow cones. The plugs are formed with threaded bores into which threaded pins are screwed. Straps are placed between the facing ends of the plugs onto which the crossbars are stuck. The load supporting ability of this construction is rather limited and the connections for the crossbars interrupt the cylindrical outer surface of the column. Another support structure of the aforementioned kind is also known in which the facing ends of the tubular column section are provided with inner screw threads into which nipples with outer screw threads are screwed, in which the nipples are pot-shaped or tubular and slitted from one of the ends thereof. The crossbars have end portions fitting into the slots. The last-mentioned construction is expensive to produce and its carrying ability is also limited.

SUMMARY OF THE INVENTION

It is an object of the present invention to provide a support structure of the aforementioned kind which avoids the disadvantages of such support structures known in the art.

It is a further object of the present invention to provide a support structure of the aforementioned kind which can be manufactured at reasonable cost and which has a load-carrying capacity which is greatly improved over that of such support structures known in the art.

It is an additional object of the present invention to provide for a support structure of the aforementioned kind which has a pleasing outer appearance.

With these and other objects in view, which will become apparent as the description proceeds, the support structure for furniture or the like according to the present invention mainly comprises at least one vertical column and at least one crossbar releasably connected to the column. The column comprising at least two tubular column sections each having an end face abutting against a corresponding end face of the outer section, a tension member extending through the tubular column sections and engaging the inner surfaces thereof to maintain the section axially aligned with each other, and a pair of end members respectively engaging the opposite end faces of the column sections and connected to the tension member for maintaining the one end faces of the column section in tight abutment with each other, one of the tubular column sections constituting a coupling member and being provided with laterally extending coupling means to which the crossbar is releasably connected. Such a column has a high load carrying capacity and the various column sections are held perfectly aligned in axial direction by the tension member. In addition the column will have throughout its length a uniform outer surface which will give the column an aesthetically pleasing appearance.

The column may comprise at least three column sections in which the column section constituting the coupling member is arranged between the other two column sections. Preferably, cooperating means are provided on the coupling member and the tension member for preventing turning of these two members relative to each other while permitting axial movement of these members relative to each other. Such cooperating means may comprise a plurality of radially projecting and longitudinally extending ribs on the tension member and at least one longitudinally extending groove in the coupling member into which one of the ribs is engaged. Preferably, the groove is formed between two longitudinally extending ribs projecting spaced from each other inwardly of the tubular coupling member. In order to make it possible to arrange one of the coupling members between an end member and a tubular column section adjacent thereto, each of the end members has a centralizing projection extending into and engaging in the inner surface of the respective tubular column section in which the centralizing projection is formed with a flat to provide clearance for the inwardly projecting ribs on the coupling member.

The tension member is preferably provided with a central bore extending longitudinally therethrough and formed at opposite end portions with an inner screw thread and this arrangement includes screw means extending through the end members and threadingly connected with the inner screw threads. The coupling means on the coupling member preferably comprise a pair of substantially parallel tenons projecting laterally from the coupling member. If a plurality of crossbars are to be connected at the same elevation to a column and extending therefrom in different direction, then the coupling members are provided with pairs of tenons respectively projecting in different directions therefrom. The tenons are preferably formed with threaded bores so as to fix the crossbars thereon. The crossbars preferably comprise a pair of laterally spaced rectangular channel portions connected to each other by a web and the tenons of the coupling members respectively engage into the channel portions. It is also possible to provide the coupling members with differently profiled tenons or tenon arrangements which can be connected with crossbars of different configurations, which in turn makes it possible to vary the support structure in different ways.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a perspective exploded view of the support structure according to the present invention;

FIG. 4 is a perspective view of a modified column.

DESCRIPTION OF THE PREFERRED EMBODIMENTS

Figure 1:
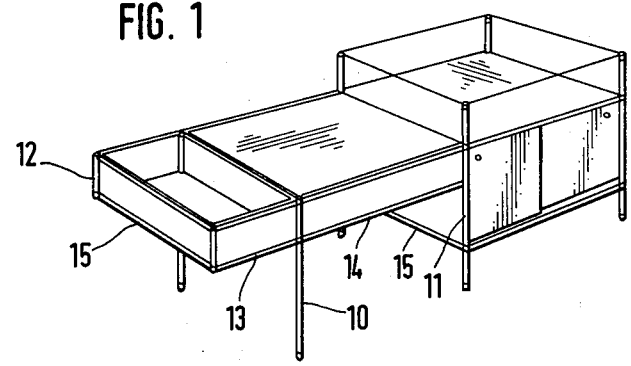
FIG. 1 is a perspective view of a support structure according to the present invention used in this case as a display stand, in which plates are connected to the crossbars in a manner not forming part of the present invention.

FIG. 1 schematically illustrates a display stand which comprises vertical columns 10, 11 and 12 to which horizontally extending crossbars 13, 14 and 15 are connected which hold between themselves wall portions.

Figure 3:
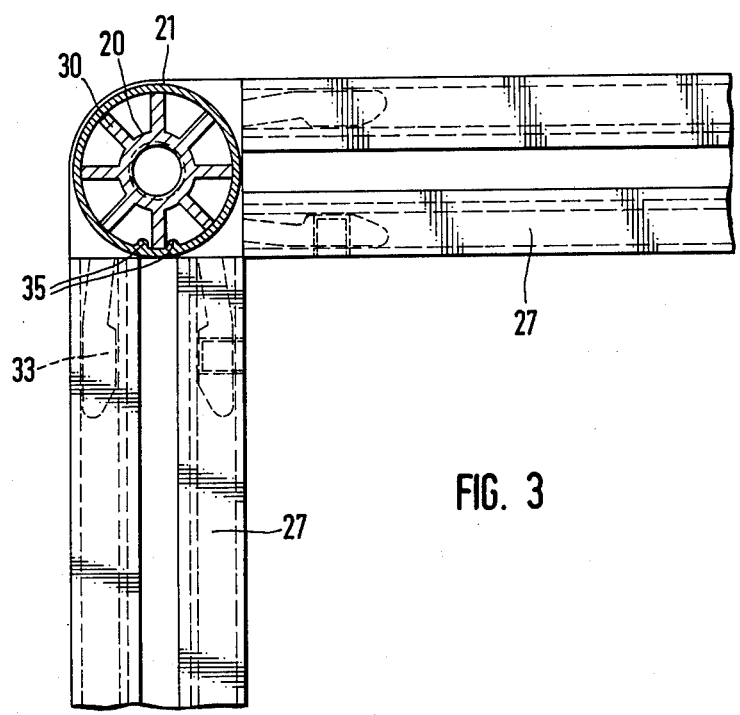
FIG. 3 is a partial partially sectioned top view showing the connection of two crossbars with a column.

The support structure according to the present invention illustrated in FIG. 2 and 3 comprises at least two tubular column sections 21 and 22 each having an end face abutting in the assembled condition of the column against a corresponding end face of the other section, a tension member or tension shaft 20 extending through the tubular column sections and engaging the inner surfaces thereof to maintain the sections axially aligned with each other, and a pair of end memebers 23 respectively engaging the opposite end faces of the column sections and connected to the tension member 20 for maintaining the one end faces of the column sections in tight abutment with each other. One of the tubular column sections that is the column section 22 constitutes a coupling member and is provided with laterally extending coupling means 33 to which a crossbar 27 is to be releasably connected. The column may further include a foot member 26, height adjustably connected to the lower one of the end members.

The column may comprise more than two column sections, for instance three column sections in which the column section constituting the coupling member may be arranged between facing ends of two of the other column sections.

The tension member or tension shaft 20 has a star-shaped cross-section, here shown as including a plurality, for instance 8, radially projecting and longitudinally extending ribs 30 and the tension member 20 is further provided with a longitudinally extending bore 31 therethrough which is formed at opposite ends with inner screw threads. The tension member 20 may be integrally formed throughout the length of the column, but on the other hand, it can also be formed from a plurality of members connected to each other by correspondingly threaded nipples or the like, so that the length of the tension member can be adapted to various lengths of the column.

The column sections constituting the coupling members 22 comprise each an annular portion 32 having an inner diameter corresponding substantially to the maximum outer diameter of the tension member 20, and at least one pair of tenons 33 projecting laterally from the annular portion 32 and each provided with a threaded bore 34. If desired, a plurality of tenon pairs 33 may project in different directions from the annular portion 32. A pair of short ribs 35 project spaced from each other inwardly from the annular portion 32, defining between themselves a longitudinally extending groove 36, into which one rib 30 of the tension member is engaged to thus prevent turning of the coupling member 22 relative to the tension member 20. The groove 36 on the coupling member 22 and the ribs 30 on the tension member 20 constitute therefore cooperating means for preventing turning of the coupling member relative to the tension member, while permitting axial movement of these two members relative to each other. If the tension member 20 is provided, as shown, with eight radially projecting ribs 30, it is therefore possible to connect a coupling member 22 in eight selectable positions to the tension member. The column sections or tubular members 21 have an inner diameter substantially corresponding to the outer diameter of the tension member tension shaft 20 so that the latter passes substantially without play through the tubular members 21.

Each of the end members 23 has at one end a flange 38 adapted to abut against a corresponding end face of a column section 21 or 22 and a centralizing projection 39 adapted to extend into and engaging the inner surface of the respective tubular column section. The centralizing projection 39 is formed at one side thereof with a flat 40 to provide clearance for the inwardly projecting ribs on the coupling member. Screw means 24, respectively 25 extend through and beyond the end members 23 to be threadingly connected to the threaded portions at opposite ends of the tension member 20 to thereby press the flanges 38 of the end members against corresponding end faces of the tubular column sections. The screw means 25, cooperating with the end member at the lower end of the column, is provided with an upper threaded portion 25' extending through the respective end member to be threadingly connected with inner thread of the corresponding end portion of the tension member and a lower threaded portion 41 of a diameter larger than that of the upper portion to which a foot member 26 formed with a central threaded bore may be connected adjustable in vertical direction.

The crossbar 27 preferably comprises a pair of laterally spaced rectangular channel portions 42, into which the tenons 33 of the coupling member 22 are respectively engaged in the assembled condition of the support structure, and the channel portions 42 are connected to each other by a horizontally extending web 43. The channel portions 42 define, between the inner wall portion thereof, grooves 44 adapted to receive wall portions of the stand as shown in FIG. 1.

While in FIG. 2 only a single crossbar is shown which is to be connected to the tenons 33 of the coupling member 22, shown to be arranged between the upper end member 23 and an upper end face of the lower column section 21, it is to be understood that, if a plurality of tubular column sections 21 are provided, as shown in FIG. 2, an additional coupling member 22 may be arranged between the opposite end faces of the tubular column sections 21 and at least one additional crossbar 27 may be connected to this additional coupling member.

The crossbars 27 may be further fixed to the respective tenons 33 of the coupling member or members by screws extending through appropriate bores of the crossbar 27 and threadingly connected to the threaded bores 34 in the tenons.

FIG. 4 illustrates a column comprising three column sections, in which the column section 22 constituting the coupling member is arranged between two column sections 21.

It will be understood that each of the elements described above, or two or more together, may also find a useful application in other types of supporting structures for furniture or the like, differing from the types described above.

While the invention has been illustrated and described as embodied in a supporting structure for furniture or the like comprising at least one vertical column and at least one crossbar releasably connected thereto, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A support structure for furniture or the like comprising at least one vertical column and at least one crossbar releasably connected to said column, said column comprising at least two tubular column sections, each having one end face abutting against a corresponding end face of an adjacent column section and an opposite end face, a tension member extending through said tubular column sections and engaging the inner surfaces thereof to maintain said sections axially aligned with each other, and a pair of end members respectively engaging said opposite end faces of said column sections and connected to said tension member for maintaining the one end face of one column section in tight abutment with the one end face of the other column section, one of said tubular column sections constituting a coupling member and being provided with laterally extending coupling means to which the crossbar is releasably connected; and cooperating means on said coupling member and said tension member for preventing turning of said members relative to each other while permitting axial movement relative to each other, said cooperating means comprising a plurality of radially projecting and longitudinally extending ribs on said tension member and at least one longitudinally extending groove in said coupling member in which one of said ribs is engaged.

2. A support structure as defined in claim 1, wherein said column comprises at least three column sections, said column section constituting said coupling member being arranged between the other two column sections.

3. A support structure as defined in claim 1, wherein said groove is formed between two longitudinally extending ribs projecting spaced from each other inwardly of said tubular coupling member.

4. A support structure as defined in claim 3, wherein each of said end members has a centralizing projection extending into and engaging the inner surface of the respective tubular column section, said centralizing projection being fromed with a flat to provide clearance for said inwardly projecting ribs on said coupling member.

5. A support structure as defined in claim 6, wherein the end member adapted to be located at the lower end of the column is provided with a central bore, said screw means cooperating with the end member at the lower end of said column having an upper threaded portion threadingly connected with said inner screw thread on the corresponding end portion of said tension member and a lower threaded portion of a diameter larger than that of said upper portion, and including a foot member formed with a central threaded bore, said lower threaded portion being adjustably screwed into said threaded bore of said foot member.

6. A support structure as defined in claim 1, wherein said tension member is provided with a central bore extending longitudinally therethrough and formed at opposite end portions with an inner screw thread, and including screw means extending through said end members and threadingly connected with said inner screw threads.

7. A support structure as defined in claim 1, wherein said coupling means comprises a pair of substantially parallel transversely spaced tenons projecting laterally from said coupling member.

8. A support structure as defined in claim 7, wherein each of said tenons is formed with a transverse bore therethrough.

9. A support structure as defined in claim 8, wherein each of said bores is formed with an inner screw thread.

10. A support structure as defined in claim 7, wherein said crossbar comprises a pair of laterally spaced rectangular channel portions connected to each other by a web, said tenons being respectively engaged in said channel portions.

* * * * *